United States Patent
Synnevaag

(10) Patent No.: US 9,594,180 B2
(45) Date of Patent: Mar. 14, 2017

(54) REMOVING GHOST REFLECTIONS FROM MARINE SEISMIC DATA

(71) Applicant: CGG MARINE (NORWAY) AS, Oslo (NO)

(72) Inventor: Johan-Fredrik Synnevaag, Oslo (NO)

(73) Assignee: CGG MARINE (NORWAY) AS, Oslo (NO)

(*) Notice: Subject to any disclaimer, the term of this patent is extended or adjusted under 35 U.S.C. 154(b) by 646 days.

(21) Appl. No.: 14/067,287

(22) Filed: Oct. 30, 2013

(65) Prior Publication Data

US 2014/0121981 A1  May 1, 2014

Related U.S. Application Data

(60) Provisional application No. 61/722,204, filed on Nov. 4, 2012, provisional application No. 61/721,234, filed on Nov. 1, 2012.

(51) Int. Cl.
*G01V 1/28* (2006.01)
*G01V 1/36* (2006.01)

(52) U.S. Cl.
CPC ......... *G01V 1/364* (2013.01); *G01V 2210/56* (2013.01)

(58) Field of Classification Search
CPC ..... G01V 2210/56; G01V 1/364; G01V 1/368
See application file for complete search history.

(56) References Cited

U.S. PATENT DOCUMENTS

| 5,148,406 | A | 9/1992 | Brink et al. |
|---|---|---|---|
| 6,493,636 | B1 | 12/2002 | DeKok |
| 2010/0074049 | A1 | 3/2010 | Kragh et al. |
| 2011/0292762 | A1* | 12/2011 | Ozdemir ............ G01V 1/3808 367/24 |
| 2012/0221075 | A1* | 8/2012 | Bentwich ............ A61B 5/0476 607/45 |

OTHER PUBLICATIONS

Kundur et al., 'Blind Image Deconvolution: An Algorithmic Approach to Practical Image Restoration', May 1996, UOT Publicaition, pp. 1-42.*
M. Van Der Baan, et al., "Robust Wavelet Estimation and Blind Deconvolution of Noisy Surface Seismics", Geophysics, Sep.-Oct. 2008, pp. V37-V46, vol. 73, No. 5.
B.J. Posthumus, "Deghosting Using a Twin Streamer Configuration", Geophysical Prospecting, Apr. 1993, pp. 267-286, vol. 41, No. 3.

(Continued)

*Primary Examiner* — Elias Desta
(74) *Attorney, Agent, or Firm* — Patent Portfolio Builders PLLC

(57) ABSTRACT

Presented are methods and systems for deghosting seismic trace data. A cost function and one or more applicable constraints are selected and used to generate a time-variant deghosting filter. The time-variant deghosting filter can be recalculated for predetermined time intervals over the span of the associated seismic data. The time-variant deghosting filter is then applied to the seismic trace data to attenuate ghosts within the predetermined time interval. A plurality of seismic trace data can be stacked before generating and applying the time-variant deghosting filter.

18 Claims, 15 Drawing Sheets

(56) References Cited

OTHER PUBLICATIONS

J. Robertsson, et al., "Rough-Sea Deghosting Using a Single Streamer and a Pressure Gradient Approximation", Geophysics, Nov.-Dec. 2002, pp. 2005-2011, vol. 67, No. 6.
Y. Zhang et al., "A New Bidirectional Deconvolution Method that Overcomes the Minimum Phase Assumption", SEP Report No. 142, Jun. 2011, pp. 1-13.
Z. Zhou, et al., "Analysis of a Broadband Processing Technology Applicable to Conventional Streamer Data", First Break, Oct. 2012, pp. 77-82, vol. 30.

* cited by examiner

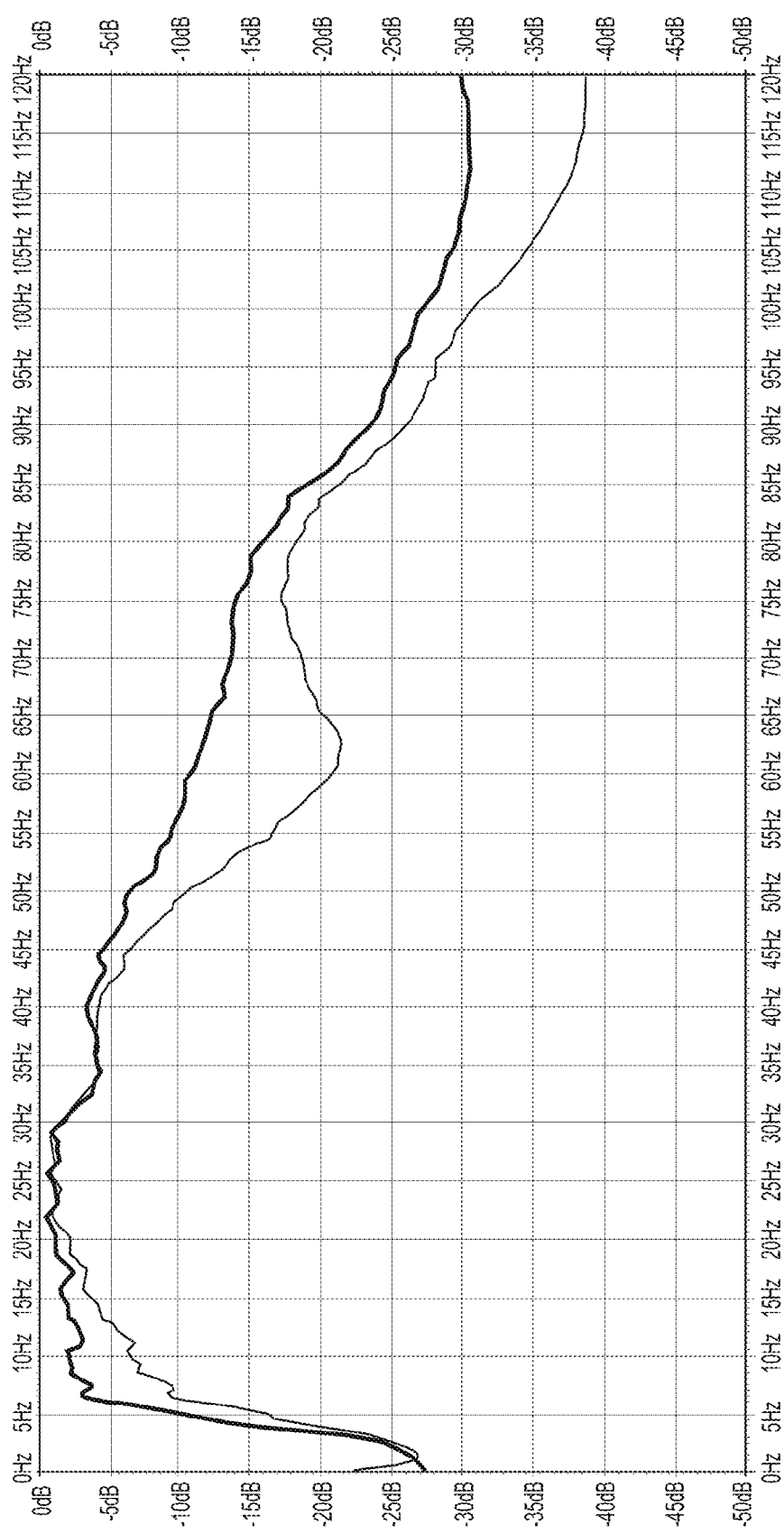

REMOVING GHOST REFLECTIONS FROM MARINE SEISMIC DATA

RELATED APPLICATION

The present application is related to, and claims priority from U.S. Provisional Patent Application No. 61/721,234, filed Nov. 1, 2012, entitled "Method and System for Removing Ghost Reflections from Marine Seismic Data," to Johan-Fredrik SYNNEVAAG, the disclosure of which is incorporated herein by reference, as well as U.S. Provisional Patent Application No. 61/722,204, entitled "Seismic Target Illumination", filed on Nov. 4, 2012, the disclosure of which is incorporated here by reference.

TECHNICAL FIELD

Embodiments of the subject matter disclosed herein generally relate to methods and systems for seismic data processing and, more particularly, to mechanisms and techniques for removing ghost reflections from seismic data.

BACKGROUND

Seismic data acquisition and processing techniques are used to generate a profile (image) of a geophysical structure (subsurface) of the strata underlying the land surface or seafloor. Among other things, seismic data acquisition involves the generation of acoustic waves and the collection of reflected/refracted versions of those acoustic waves to generate the image. This image does not necessarily provide an accurate location for oil and gas reservoirs, but it may suggest, to those trained in the field, the presence or absence of oil and/or gas reservoirs. Thus, providing an improved image of the subsurface in a shorter period of time is an ongoing process in the field of seismic surveying.

Mapping subsurface geology during exploration for oil, gas, and other minerals and fluids uses a form of remote sensing to construct two-dimensional or three-dimensional images of the subsurface. The process is known as seismic surveying, wherein an energy source transmits pressure pulses into the earth. These pressure pulses can be reflected by geological interfaces associated with the earth and subsequently recorded at the surface by arrays of detectors.

A contaminant which causes problems in processing and interpreting the subsurface data is a phenomenon known as a ghost reflection. Ghost reflections are caused by the sea-surface operating as a mirror and reflecting up-going pressure-waves. There are source-side ghosts caused by the source energy being reflected back from the sea-surface and there are receiver-side ghosts incident at the detectors as down going surface reflections of the up-going energy from the subsurface.

These ghost reflections do more than complicate the subsurface image with additional waves, the mirror effect which produces the ghost reflections changes the phase of the reflection by 180 degrees such that, in some circumstances, the energy constructively interferes with the desired signal to magnify it and, in other circumstances, destructively interferes with and destroys the desired signal.

Water surface reflections of very long wavelength, low frequency seismic waves, destructively interfere such that there is always a null or notch at zero Hertz. These notches and the associated filtering limit the extent to which subsurface reflections or events can be resolved. This damaging process results in blurred images at best, and at worst, fictitious reflections when the ghost energy lags significantly behind the primary reflection energy. To counter the effect of the notches, conventional seismic surveys are designed to use shallow source and receiver arrays to ensure that the second notch lies at high frequencies. However, the resultant sloped bandpass filter is a pervading problem as it causes seemingly irretrievable damage to low frequency information which is increasingly being sought in the industry to deliver extra value in the interpretation process. Furthermore, a relatively shallow tow of the receivers exposes them to the very noisy-environment that exists close to the sea surface which in itself can be problematic.

Most existing mechanisms to de-ghost seismic data fundamentally rely on recording alternate views of the same data. Data are deliberately acquired with different ghost characteristics so that when combined there is improved signal spectrum coverage and the damaging notches are filled.

There are three commonly used data acquisition variations designed to tackle the ghost problem: slanted streamers; parallel streamers arranged vertically one above another at the same horizontal position, known as "over-under", and mixtures of different types of detectors (e.g., use of hydrophones with vector-sensors such as accelerometers) at a coincident position, are representative.

The former techniques exploit variations in the recorded ghost effect, which can be processed together to de-ghost the signals. The latter exploits the fact that up-going and down-going energy exhibit different polarity which one type of detector is able to observe, whereas the other type does not. This allows the ghost energy to be removed by careful summation of the two signals based on the fact that the ghost is of opposite polarity in one of the recorded datasets. The slanted streamer array technique deploys (current) standard streamer equipment, whereas the other two data acquisition techniques use an increased number of streamers or sets of duplicate detectors, often called 'dual sensors'. These therefore increase, doubling at maximum, the amount of data traces recorded.

Once recorded, the data are routinely processed in a computer. The term de-ghosting is used to describe the computer-based step to reduce or remove the ghost effect from the data. Many de-ghosting processes today either involve some adaptive summation to extinguish the ghost by polarity difference, or adaptive summation of differently ghosted waveforms to recombine the primary signal present in both, in essence to infill the spectral notches.

The majority of marine seismic data is acquired with conventionally towed streamers which are equipped with only hydrophones and are all typically towed at the same constant depth for any single survey. Fundamentally, it would be advantageous if methods and systems existed that were able to de-ghost the conventionally acquired marine seismic data. Such a method would not depend on special acquisition geometry or special hardware. Instead, in one example, it would be based on only post-acquisition, specially configured computing hardware and/or software, and therefore be backward compatible with all previously acquired and existing seismic data.

Accordingly, it would be desirable to provide systems and methods that avoid the afore-described problems and drawbacks associated with deghosting seismic data.

SUMMARY

Thus embodiments described herein provide techniques and systems for deghosting seismic data in a manner which preserves primary wave data without amplifying noise.

According to an embodiment, a method, stored in a memory and executing on a processor, for attenuating ghost reflections in seismic trace data, includes the steps of generating a time-variant deghosting filter based on a cost function using at least one constraint which preserves primary wave data; and applying the time-variant deghosting filter to the seismic trace data for attenuating the ghost reflections.

According to another embodiment, a method, stored in a memory and executing on a processor, for attenuating ghost reflections from seismic trace data, includes the step of applying a time-variant deghosting filter to the seismic trace data.

According to another embodiment, a method, stored in a memory and executing on a processor, for attenuating ghost reflections in seismic trace data, includes the steps of: selecting a cost function and at least one associated constraint for optimizing removal of the ghost reflections wherein the cost function is based on one or more of a plurality of computations comprising a variance computation, an $L^P$ Norm computation, a hybrid norm computation and a Wiener entropy computation and the optimizing is based on a predetermined library of predefined filters, generating a time-variant deghosting filter based on the cost function wherein the time-variant deghosting filter is based on a plurality of parameters comprising a seismic source depth, a seismic receiver depth and an estimated sea-surface reflection coefficient; and applying the time-variant deghosting filter to the seismic trace data for attenuating the ghost reflections wherein the time-variant deghosting filter is recalculated for each of a plurality of time intervals associated with the seismic trace data.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 14 depicts the magnitude spectra of before and after images associated with application of the embodiments described herein.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. Some of the following embodiments are discussed, for simplicity, with regard to the terminology and structure of various marine seismic acquisition systems or configurations. However, the embodiments to be discussed next are not limited to these configurations, but may be extended to other arrangements as discussed later.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to various embodiments herein, methods and systems for reducing or removing ghost reflections from marine seismic data are described. The methods and embodiments are based on, for example, constructing a time-variant deghosting filter through a constrained computation optimized by a cost function that is selected to retain the primary data while reducing or removing the effects of the ghost(s). Such methods and systems can, for example, be used to reduce the ghosts associated with seismic images without the use of special acquisition geometry or special hardware.

Figure 1:
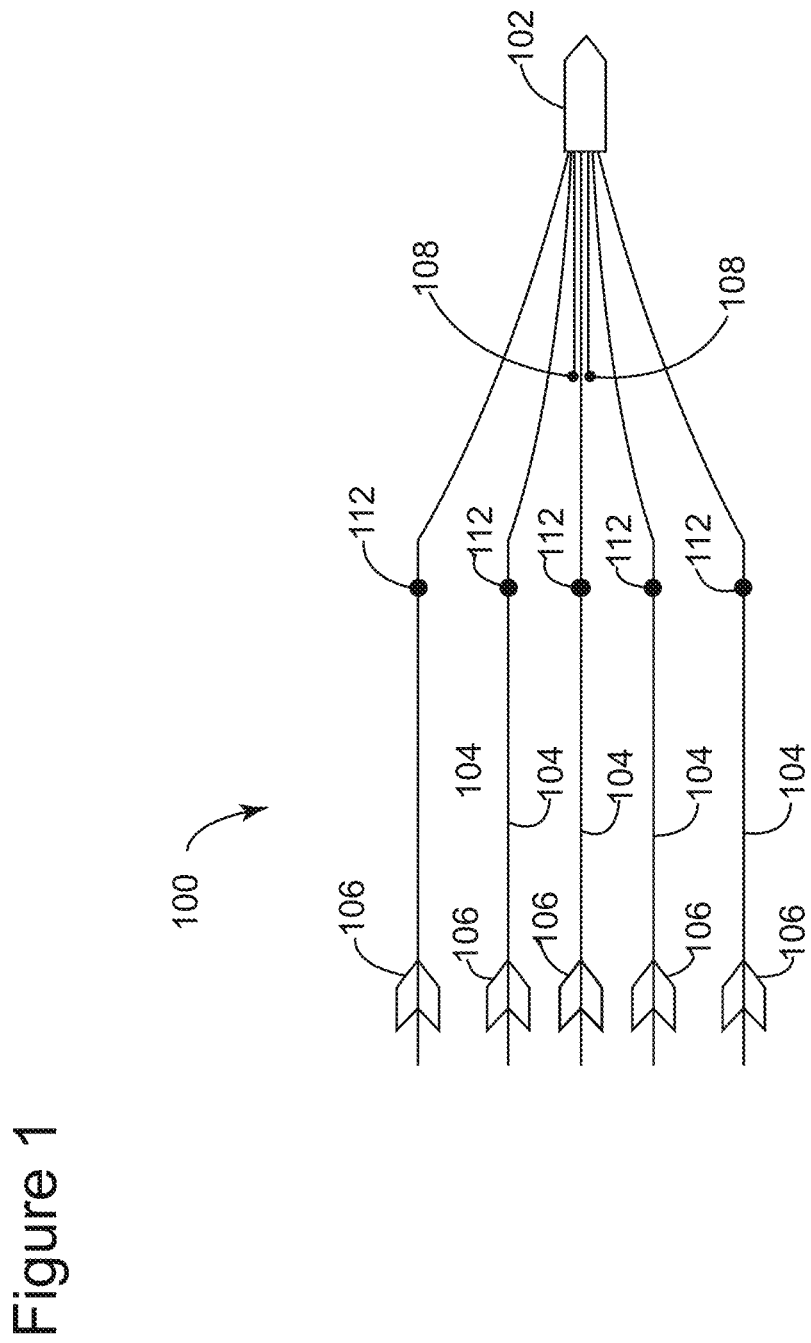
FIGS. 1, 2 and 3 depict various aspects of an exemplary marine seismic survey system in which various deghosting embodiments can be implemented.

In order to provide some context for the subsequent embodiments related to such deghosting techniques, consider first a seismic data acquisition process and system as will now be described with respect to FIGS. 1, 2 and 3. In FIG. 1, a data acquisition system 100 includes a ship 102 towing a plurality of streamers 104 that can extend one or more kilometers behind the ship 102. Each of the streamers 104 can include one or more "birds" 106 that maintain the streamer 104 in a known fixed position relative to other streamers 104. Further, the one or more "birds" 106 are capable of moving the streamers 104 as desired according to bi-directional communications received by the birds 106 from the ship 102.

One or more source arrays 108 can also be towed by ship 102, or another ship (not shown), for generating seismic waves. Source arrays 108 can be placed either in front of or behind the receivers 112 (one representative receiver per streamer), or both behind and in front of the receivers 112. The seismic waves generated by the source arrays 108 propagate downward, reflect off of, and penetrate the seafloor, wherein the refracted waves eventually are reflected by one or more reflecting structures (not shown in FIG. 1) back to the surface of the sea. The reflected seismic waves then propagate upward and are detected by the receivers 112 disposed on the streamers 104. The seismic waves then reflect off of the free surface, i.e., the surface of the sea, traveling downward and are once again detected by the receivers 112 disposed on streamers 104 as receiver ghosts. This process is generally referred to as "shooting" a particular seafloor area, with the seafloor area referred to as a "cell" and the sea surface referred to as a "free surface."

Figure 2:
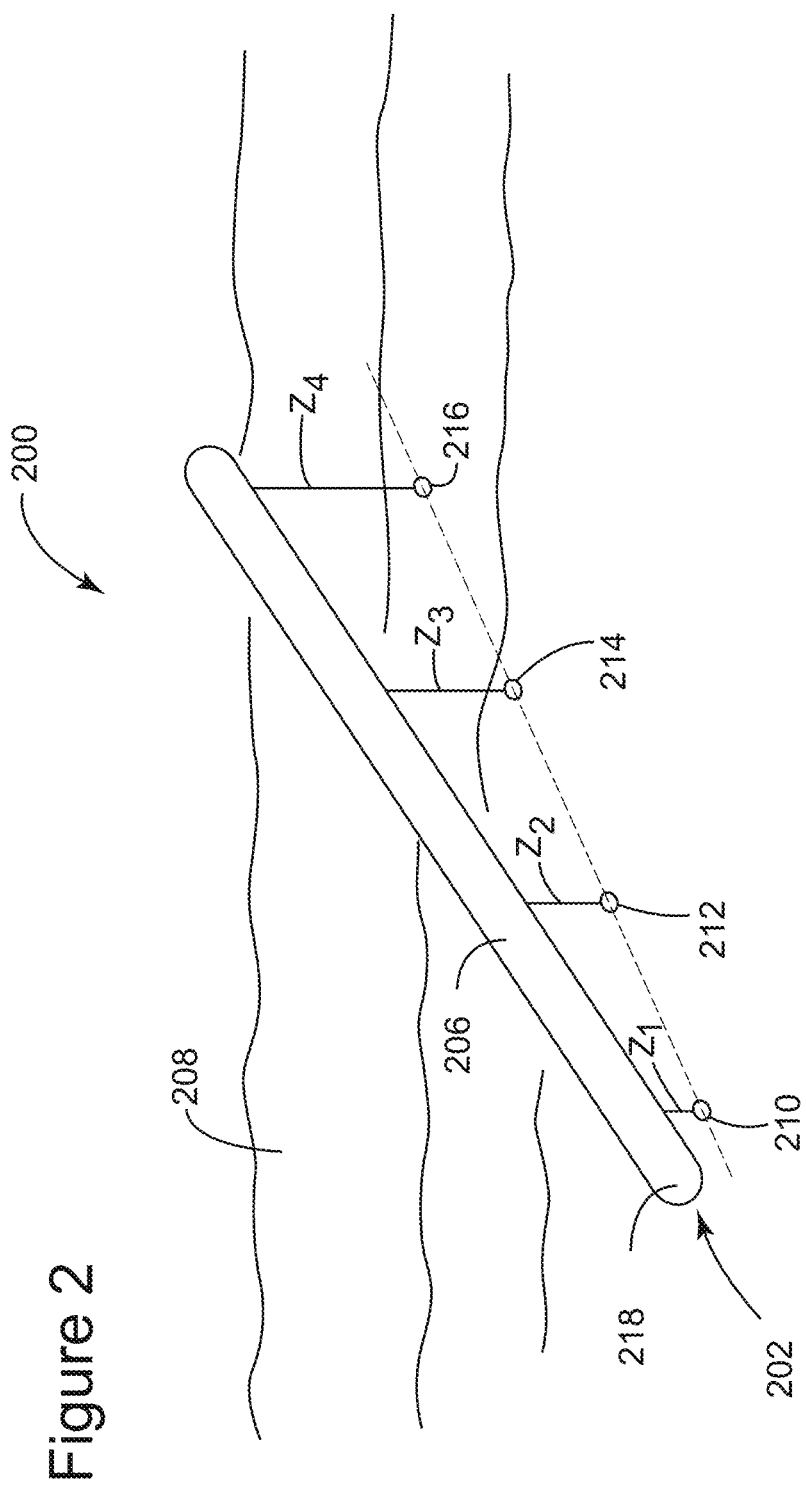

Looking to FIG. 2, the embodiments can be used with a multi-level source 200. The multi-level source 200 has one or more sub-arrays. The first sub-array 202 has a float 206 that is configured to float at the water surface 208 or underwater at a predetermined depth. Plural source points 210, 212, 214, 216 are suspended from the float 206 in a predetermined pattern. A first source point 210 can be suspended closest to the head 218 of the float 206, at a first depth z1. A second source point 212 can be suspended at a second depth z2, different from z1. A third source point 214 can be suspended at a third depth z3, different from both z1 and z2, and so on. FIG. 2 shows, for simplicity, only four source points 210, 212, 214, 216, but an actual implementation may have any desired number of source points.

The embodiments below are discussed without specifying the type of seismic receivers used to record the seismic data or specific towing arrangements, as the embodiments can be used with any such receivers or towing arrangements. However those skilled in the art will recognize that, in general for a marine seismic survey, streamers that are towed by one or more vessels and the streamers include the seismic receivers. The streamers may be horizontal or slanted or have a curved profile as illustrated in FIG. 3.

Figure 3:
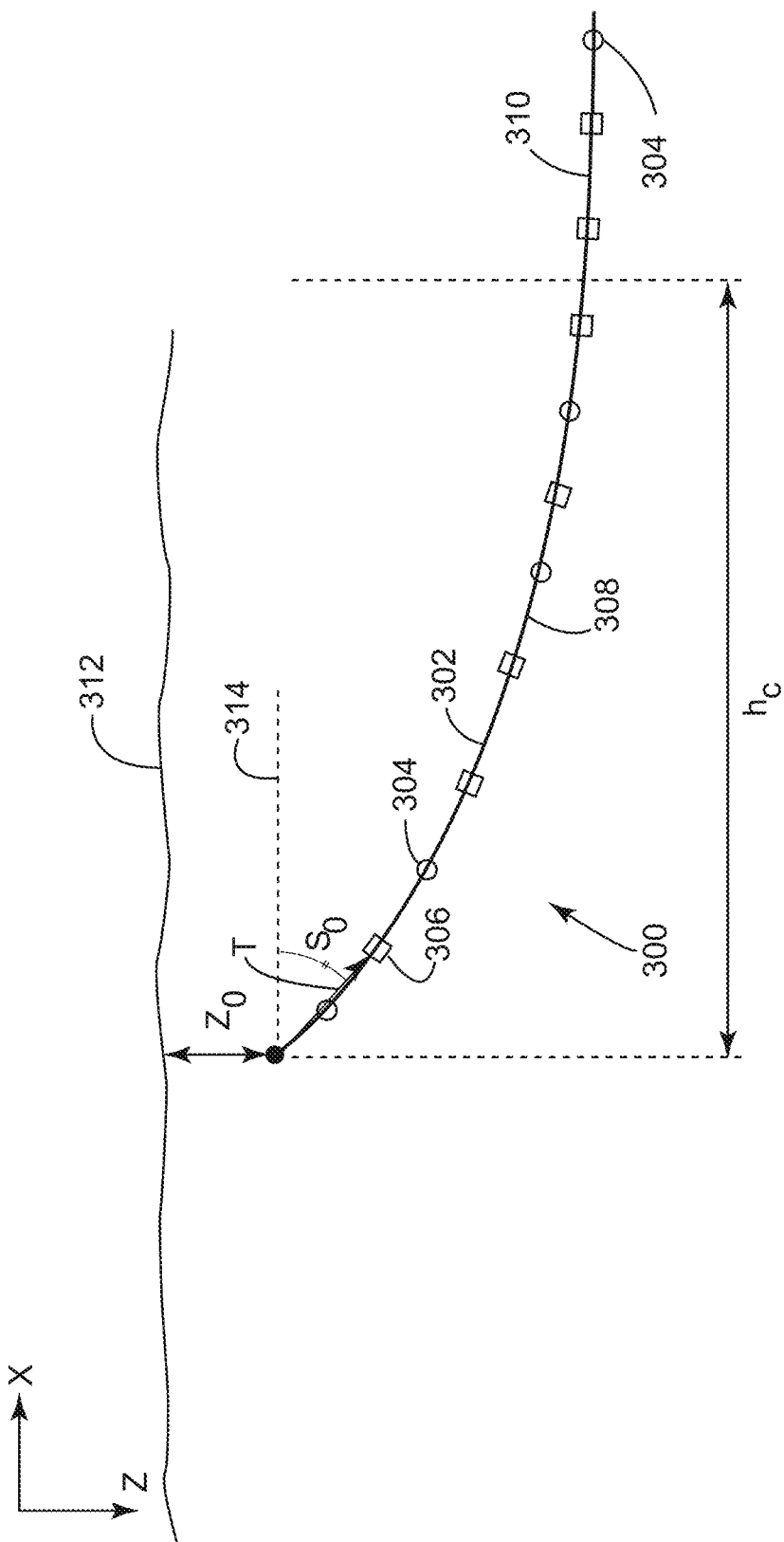

The curved streamer 300 of FIG. 3 includes a body 302 having a predetermined length; plural detectors 304 provided along the body; and plural birds 306 provided along the body for maintaining the selected curved profile. The streamer is configured to flow underwater when towed such that the plural detectors are distributed along the curved profile. The curved profile may be described by a parameterized curve, e.g., a curve described by (i) a depth z0 of a first detector (measured from the water surface 312), (ii) a slope s0 of a first portion T of the body with an axis 314 parallel with the water surface 312, and (iii) a predetermined horizontal distance hc between the first detector and an end of the curved profile. It is noted that not the entire streamer has to have the curved profile. In other words, the curved profile should not be construed to always apply to the entire length of the streamer. While this situation is possible, the curved profile may be applied only to a portion 308 of the streamer. In other words, the streamer may have (i) only a portion 308 having the curved profile or (ii) a portion 308 having the curved profile and a portion 310 having a flat profile, the two portions being attached to each other.

Figure 4:
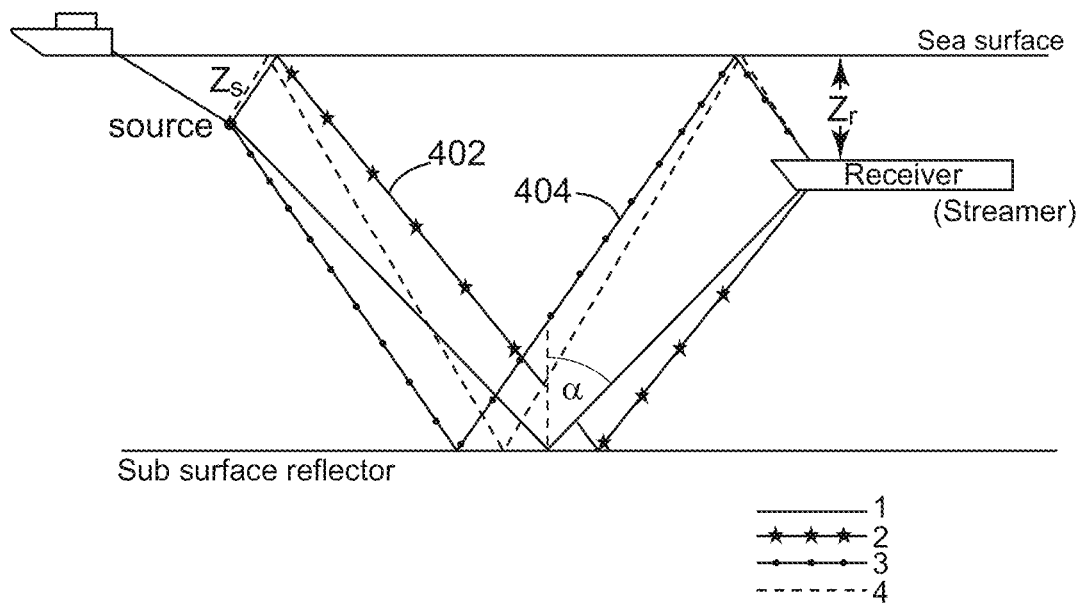
FIG. 4 depicts various ghost reflections and primary data associated with the embodiments.

With this context in mind, a discussion of ghosts and then deghosting according to the embodiments will now be presented. Considering the wave patterns associated with an offshore seismic survey, up-going seismic waves are reflected downwards by the sea surface. At any given depth below the surface, the up and down going waves interfere constructively or destructively as earlier described. Looking to FIG. 4 in a marine seismic acquisition setting, there are normally two different ghost reflections, the source ghost 402 and the receiver ghost 404.

The embodiments set forth below describe methods and systems for attenuating the effects of this ghost interference through seismic data processing. It should be noted that a simplified (multiple-free) model of one trace of sampled data, x[n], from a seismic acquisition can be represented as:

$$x[n]=s[n]*g\_s[n]*g\_r[n]*q[n]*r[n]+w[n] \quad (1)$$

where n is the temporal sample number, s[n] is the far-field signature of the seismic source, g_s[n] and g_r[n] models the source and receiver ghosts, respectively, r[n] models the earth's reflectivity series, q[n] models the effect of attenuation, and w[n] is noise.

The ghost operators, g_s[n] and g_r[n], are of the form:

$$g[n]=\delta[n]-\gamma\delta[n-\tau] \quad (2)$$

where $\delta$ is the Dirac delta function, $\gamma$ is the sea surface reflection coefficient and $\tau$ is the propagation delay between the direct wave and the ghost. Assuming a perfectly flat sea surface, the reflection coefficient, $\gamma$, is close to 1. However, in practice, $\gamma$ depends strongly on the sea-state, and varies in both space and time. A typical range of values can be between [0.6, 0.99].

Figure 5:
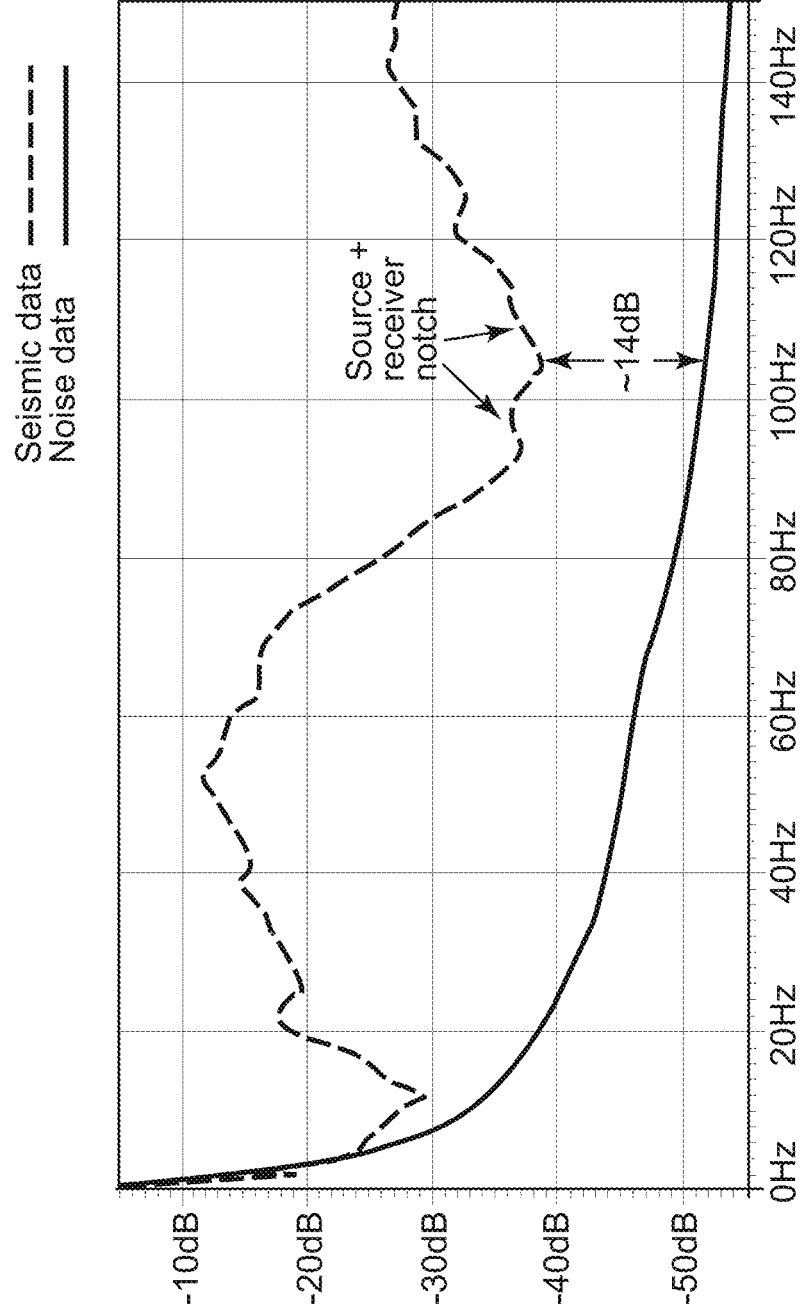
FIG. 5 depicts representative seismic data and noise data with source/receiver notches.

The implication of this practical observation to the embodiments is that, in most cases, the ghost reflection will be weaker than the up-going signal, and there will not be a total destructive interference at the notch frequency, e.g., as shown in FIG. 5 which illustrates the amplitude spectra associated with seismic data and noise. It should be noted in the embodiment that the illustrated seismic data was acquired with both sources and receivers at a depth of around five meters. It can clearly be observed that the notches in the seismic data around 100 Hz contains energy above the noise-floor (computed from noise data in the same survey). Accordingly, it is possible to recover the frequencies in the notch.

The delay, $\tau$, in Equation (2) is given by the relation:

$$\tau=2z/(v\cos(\alpha)) \quad (3)$$

where z is the depth of the source or receiver, v denotes the speed of sound in water, which is close to 1500 m/s in this purely illustrative example, and $\alpha$ is the take-off angle or the angle of incidence with which the signal impinges upon the sea surface as measured with respect to the vertical. This incidence angle again depends on the reflector dip and the source-receiver offset.

One way to remove ghost effects from acquired seismic data is to calculate, and then apply to the received seismic data, an inverse filter of the ghost models in equation (2). Generally speaking, the inverse filter of the ghost operator g[n] is a filter $g^{-1}[n]$ for which $g[n]*g^{-1}[n]=\delta[n]$ where * denotes convolution and $\delta[n]$ is the Dirac delta function. In the frequency domain, the ghost operator $G(\omega)$ is of the form: $G(\omega)=1-\gamma\exp(-i\omega T)$. The inverse filter of the ghost operator $G(\omega)$ is a filter $G^{-1}(\omega)$ for which $G(\omega)G^{-1}(\omega)=1$, i.e., $G^{-1}(\omega)=1/G(\omega)$. Thus, for a given pair $(\gamma, \tau)$, the inverse filter $g^{-1}[n]$, or its frequency domain formulation $G^{-1}(\omega)$, is uniquely defined.

Stable application of an inverse ghost filter operator for either the source, the receiver, or both, is difficult because of close-to-zero values at the notch (near singularities) and the variability of the parameters. Thus, a straightforward application of the inverse filter generates an undesirable amplification of the noise at the notch frequencies. Thus, according to these embodiments, when solving for the ghost operator is instead transformed into a constrained optimization task, it becomes possible to derive a stable technique that removes the effect of the sea surface in a time-variant fashion, without significantly affecting the noise term in equation (1).

Figure 6:
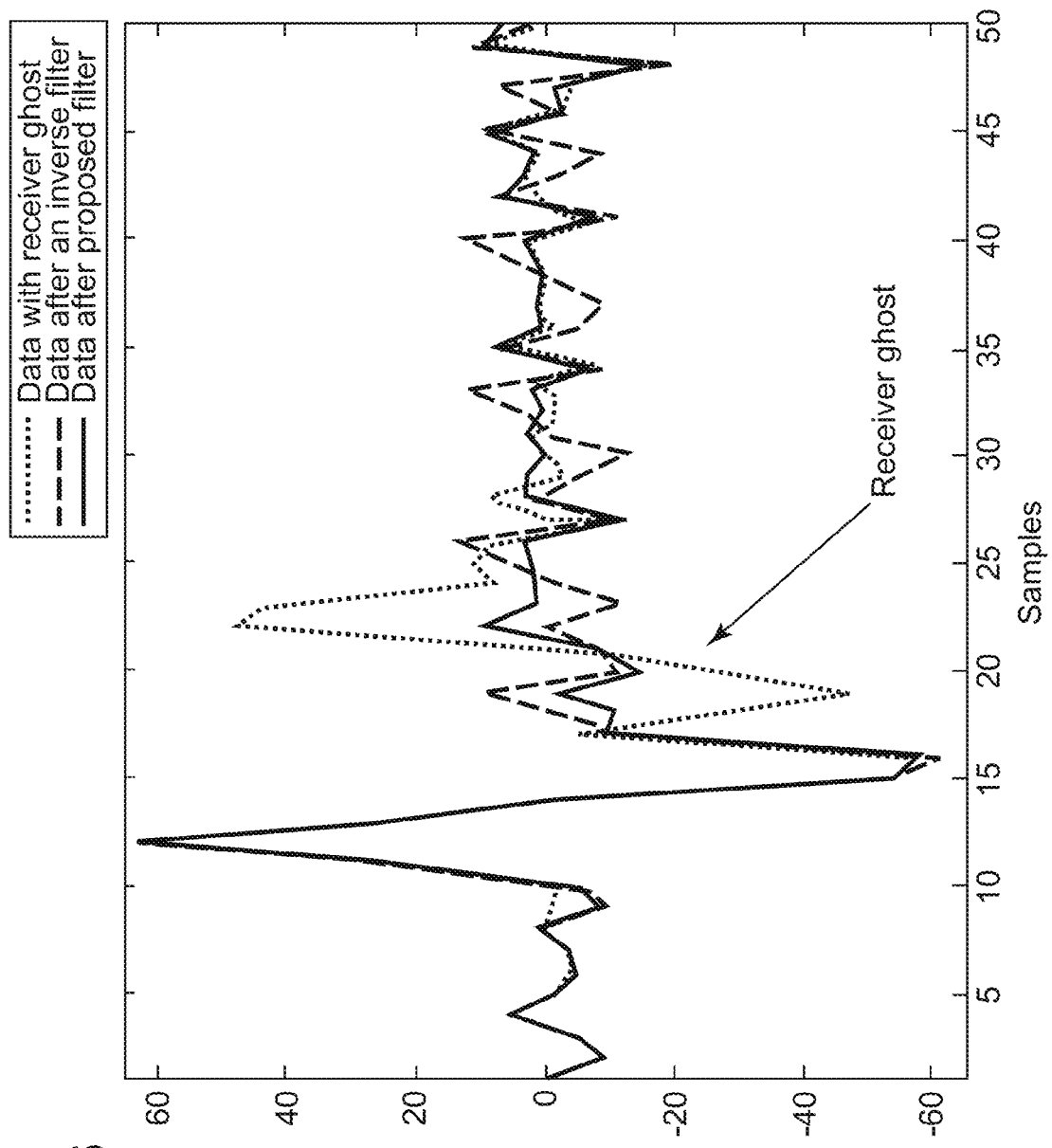
FIGS. 6-7 depict amplitude data associated with these embodiments.

To illustrate this concept according to an embodiment, a technique to attenuate the effect of the receiver side ghost will now be described. In this embodiment, a time-variant filter, f[n], is constructed which removes or attenuates the ghost reflection, without significant effect on the noise, and is found through a constrained optimization of the form:

$$\min_{f[n]}C(f[n],x[n])$$

$$\text{"subject to"}|f[n]*g\_r[n]*\bar{s}[n]|\geq|\bar{s}[n]|, n=n\_1,\ldots,n\_2 \quad (4)$$

where $C(f[n], x[n])$ is a suitable cost function, $\bar{s}[n]$ is the farfield source signature including the source ghost, $\bar{s}[n]=s[n]*g_s[n]*q[n]*r[n]$, and where the constraint ensures that the primary signal is retained after application of the filter. It should be noted in the embodiment that the constraint ensures that within the time interval n=n1, . . . , n2, the primary part of the signal resulting from deghosting is greater than or equal to the ghost free version. In other words, the constraint ensures that minimization of the cost function does not lead to a solution that attenuates the primary signal. Looking to FIG. 6, depicted is an input wavelet and the associated receiver ghost, a deghosted wavelet after application of an inverse filter and a deghosted wavelet after application of an embodiment filter. It should be noted in the embodiment of FIG. 6 that the time interval, n=n_1, . . . , n_2, is the interval in which the cost function is evaluated and a filter f[n] found. The convolution of this filter f[n] with the trace x[n] yields a cost function that is minimum over the time interval n=n_1, . . . , n_2. The convolution of this filter f[n] with the trace x[n] also gives the deghosted trace over the time interval n=n_1, . . . , n_2. It should be noted that the time interval, n=n_1, . . . , n_2 slides over the entire trace recording time and the optimization is repeated for each time interval".

Figure 7:
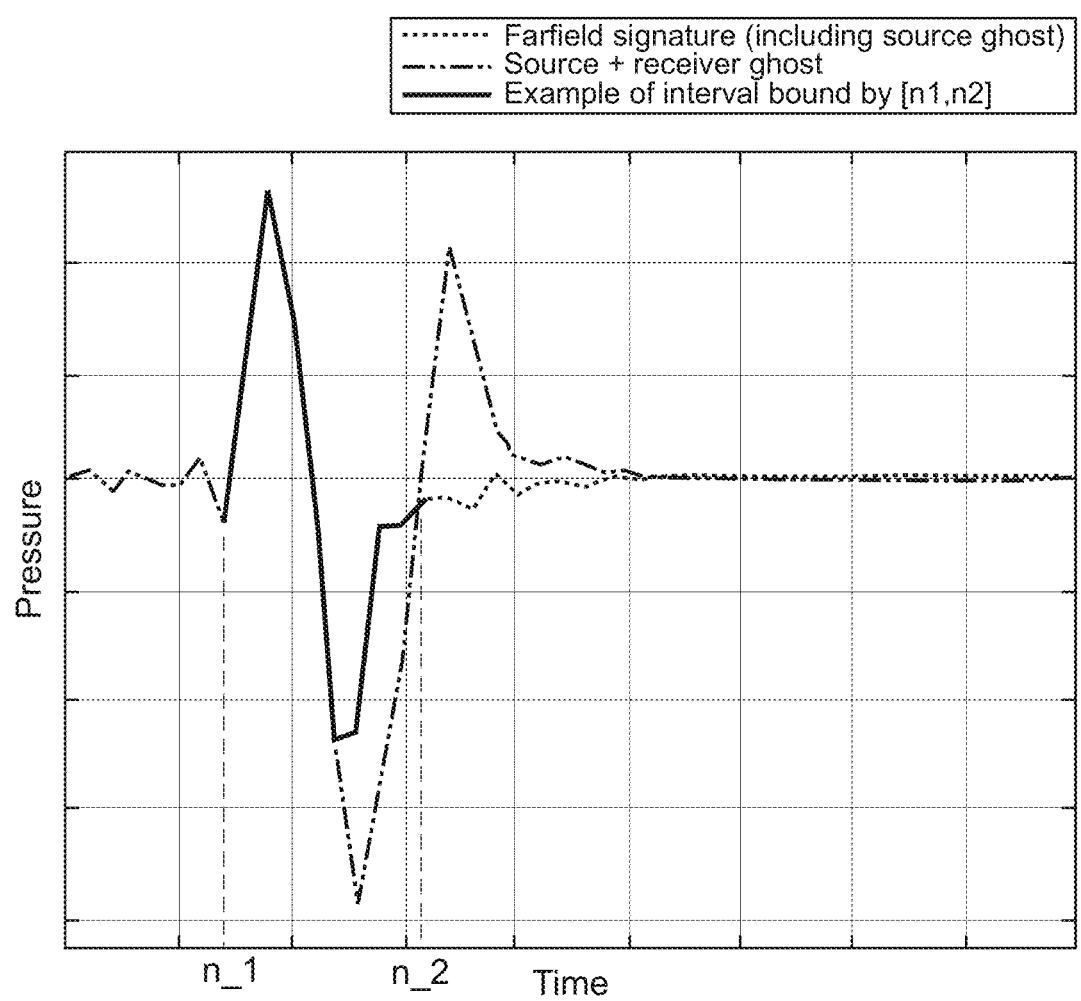

Looking to FIG. 7, depicted is an example of the constraint imposed on the filter in Equation (4). In this example, it can be seen that after the filter is applied to a far-field signature that is contaminated with a receiver ghost, the absolute amplitude of the output should be equal to (or greater than) the receiver ghost-free signature in the interval n=n_1, . . . , n_2 (the inequality is included as a generalization of the optimization). Accordingly, if an event is present in the data at any time, the ghost-free part of the signal is passed undistorted. Similarly, if only noise is present in a specific time interval, the noise will ideally be passed through without being amplified. It should be noted in the embodiment that as any one trace contains both signal and noise, the performance of the de-ghosting filter, f[n], will be dependent on the signal-to-noise ratio (SNR). It should be noted in the embodiment that the length of the time interval n=n_1, . . . , n_2, should be chosen to be greater than, or equal to, the time interval between the maximum and the minimum of the farfield signature wavelet.

It will be appreciated that various forms of cost functions can be applied to determine the ghost filter in equation (4), both in the time and frequency domain. Examples include:

Variance: $C(f[n],x[n])=E\{|f[n]*x[n]|^2\}$, $L^P$ norm: $C(f[n],x[n])=(\Sigma|f[n]*x[n]|^P)^{1/P}$, (where P≥1 is a real number)
Hybrid Norm, and
Wiener entropy (a measure of spectral flatness):

$$C(f[n],x[n]) = \frac{\exp\left(\frac{1}{N}\sum_{n=0}^{N-1}\ln(f[n]*x[n])\right)}{\frac{1}{N}\sum_{n=0}^{N-1}f[n]*x[n]}.$$

Numerous variants are contemplated. For example, it is possible to choose a number of different optimization criteria. In another example, a combination of different cost functions is used. In yet another example, two or more cost functions are simultaneously combined. In still another example, two or more cost functions are simultaneously combined and weights are applied to each.

The model and optimization in Equation (1) and Equation (4), respectively, describe a method to remove the sea surface effects. In another example, the method is used to correct for the imperfections in source output and attenuation of the signal as it propagates through the earth's interior, in addition to the ghost effects. In another example, the optimization in Equation (4) is solved by a numerical solver, e.g. through linear programming.

In another example, the solution space of the optimization is limited by using a library of K predefined filters, $f_k[n]$, k=1, . . . , K, which fulfill the constraint in Equation (4). For each sample along a seismic trace, each filter $f_k[n]$ is applied and the cost function is calculated. In one example, a predetermined criterion is used to select the optimal filter. The optimization is then of the form:

$$\min_k C(f_k[n],x[n]),k=1, \ldots , K. \qquad (5)$$

and f[n]=arg min $C(f_k[n],x[n])$.

In one example, the candidate filters for receiver side deghosting are constructed as inverse ghost operators of the form, $$f_k[n]=g_r^{-1}[n] \qquad (6)$$

by systematically varying γ and τ. Here, the indice k refers to a given value of the pair (γ, τ). The candidate filter for the value γ=0 can also be included. The actual implementation of the inverse filters can be varied, and the filters are not necessarily constrained to be of the form in Equation (6).

The foregoing discussion focuses on receiver-side deghosting, however the present invention is not so limited. In one example, the same technique is applied to attenuate the source side ghost. In a further example, the method is extended to attenuate both the source and receiver ghosts. Considering FIG. 4 and Equations (2), (3) and (4), it is apparent that all of the ghost reflections can be described by operator g[n], where as a first approximation only the ghost-time delay coming from the depth of the source and/or the receiver and reflectivity, γ, need to be taken into account. In one example, the method for de-ghosting described herein is therefore applied to remove ghost reflections in a cascading way. That is, first the method is applied to remove the effects of the receiver ghost, then, the method is applied to remove the effects of the source ghost. In another example, the optimal source and receiver de-ghosting filter is found in a combined or joint optimization, similar to the method described in Equations (2), (3) and (4).

In another embodiment, the inverse operator and the optimization scheme described above is applied on a trace-by-trace basis, in one example in a shot or, in another example in a CDP-gather. As can be appreciated, under the influence of noise, the optimal filter of an embodiment is found using a number of neighboring traces.

Continuing with an embodiment, as will be appreciated by those skilled in the art, seismic data consist of a signal component and a noise component. However, as a general definition, it can be said that any recorded energy which interferes with the desired signal can be considered as noise. The noise can be classified as background noise (for instance wind, swell, noise from nearby production, or interference from nearby seismic acquisition), source-generated noise (for instance direct and scattered waves or multiples), and instrument noise. Noise can show up as coherent or incoherent energy in seismic gathers. This diversity of noise-types, with different characteristics, makes separation of signal and noise a challenging process. As mentioned previously, in some examples, the performance of the method is dependent on the signal-to-noise ratio for any given trace. Accordingly, in one example, before applying the de-ghosting procedure described herein, it is beneficial to remove as much noise as possible from the data. In practice, in one example, this means that de-ghosting optimally takes place late in the seismic processing sequence, and, in another example, only after various types of background noise and multiples are removed from the data.

In one example of constructing a time-variant de-ghosting filter, the filter parameters are adjusted along the seismic trace to adapt to time-variant changes in the recorded seismic data. The effect of the sea surface reflection(s) on the seismic data can be described by a filter, g[n]. The inverse of filter g[n] can remove the signal associated with these reflections. However, the inverse of filter g[n] is not a stable filter, but tends to boost both high and low frequency noise. Accordingly, it is desirable to find a de-ghosting filter that removes or otherwise attenuates the sea surface reflections without amplifying the noise. Although not a true inverse filter, the constructed filter removes or otherwise attenuates the signal associated with the sea surface reflections without amplifying the noise. The filter will thus "adapt" to the recorded data, in the sense that it will attempt to perform as good a de-ghosting as possible without unduly amplifying the noise. Hence, the filter characteristics will change along the seismic trace, making it a time-variant filter. In practice, in one example, a new set of filter coefficients is found for each time instance, n. The filter coefficients are applied to a time window (subset) of the seismic trace. The time interval is moved along the trace (in time), and a new set of filter coefficients are computed. The filter, being a time-variant filter, is applied "in a time-variant fashion".

In this way, an optimal de-ghosting filter for a given time instance, n, is found (constructed) through an optimization. In another example, a set of predefined candidate filters are evaluated using a similar cost function as used in the optimization step for each time instance along the trace.

In one example, a constrained optimization is an optimization where the filter output must fulfill a given criteria. In another example, the constraints force the filter to only attenuate the sea surface ghost, not the "primary" data. In another example, the predetermined constraints include a model of the source signature and a model of the ghost filter.

In one example, a cost function gives a measure of how good a given solution is. In one example, the cost function measures of how well a candidate filter, $f_k[n]$, performs de-ghosting when applied to the seismic trace, $x[n]$. It is desirable to make the "cost" as small as possible, hence the minimization. Alternatively, a cost function can be called an optimization function.

In one example, the constraint imposed on the filter, f[n], is that it leaves the "primary" component undistorted in the seismic trace after application of the filter. In one example, this is achieved by setting the constraint criteria to ensure that if the filter is applied to a seismic trace containing a single event, the amplitude of the output is equal to or larger than the amplitude of the "ghost-free" signal, for the duration of the ghost-free part of the signal. This is illustrated in FIG. 7, where the black solid line gives the seismic trace time interval of the "ghost-free" signal that it is desired to pass undistorted (in this example only the receiver ghost is compensated).

In one example, retaining the primary data means that all data associated with the "direct wave" is still present in the seismic trace after de-ghosting. Hence, the seismic events, as they would have been recorded without a reflecting sea surface, are preserved in the seismic trace in the de-ghosting process.

In one example, attenuating the effects of the ghost(s) means removing or attenuating the component of the data associated with the sea surface reflection(s). Removing implies that that we have removed all signals associated with the reflections, whereas attenuating implies that there can still be some residual energy from the reflected wave (ghost) left in the seismic trace.

In one example, the seismic data contains a "direct wave" component and a "reflected wave" component, where the reflected wave comes from reflection(s) off the sea surface. Embodiments described herein want to remove data associated with the "reflected wave" from the seismic trace, and leave the data associated with the direct wave, which are called "primary data".

In one example, "primary data" is defined as data as recorded without a source- and/or receiver-side sea surface reflection. This means that if there were no reflecting sea surface present when acquiring the seismic data trace, this is what the recorded seismic trace would look like. In some examples, a distinction has been made between the reflection from above the source, and the reflection from above the receiver, as the method, in certain examples, can be used to attenuate either or both.

A system for practicing the embodiments is contemplated where a computer system is configured and programmed for seismic processing. In one embodiment, a library of pre-determined filters is stored and/or otherwise accessible by the computer system. In the course of seismic processing, seismic trace records are read trace-by-trace. Each seismic trace is then subjected to testing by applying two or more of the pre-determined filters to a time window portion of the seismic trace. Each output from each of the two or more pre-determined filters is input into a pre-determined cost function, such as, in one example, the L2-norm. The results from the cost function, one result for each filter tested, are compared based on predetermined selection criteria, such as, in one example, selecting the cost function result having the minimum value. Based on the comparison of the results, one of the pre-determined filters is selected. Then, the selected filter is applied to the trace in that time window portion of the seismic trace. The ghost in the time window is thus attenuated. The process is repeated for another time window portion of the seismic trace. On completion of the filtering of the seismic trace, which is now the de-ghosted trace, the newly filtered seismic trace is output. The process is repeated for the next seismic trace.

In a further example, two or more traces are input. The test filter results from each of the two or more traces are combined or otherwise stacked prior to input into the cost function. In another example, the results from each of the two or more traces are input into the cost function. The matrix of results from the cost function is then compared to select which pre-determined filter to apply. In a further example, the two or more traces have a common receiver offset. In another example, the two or more traces have a common source. In another example, the two or more traces have a common mid-point. In another example, the library of pre-determined filters is substituted with filters that are derived from the input seismic data.

Figure 8:
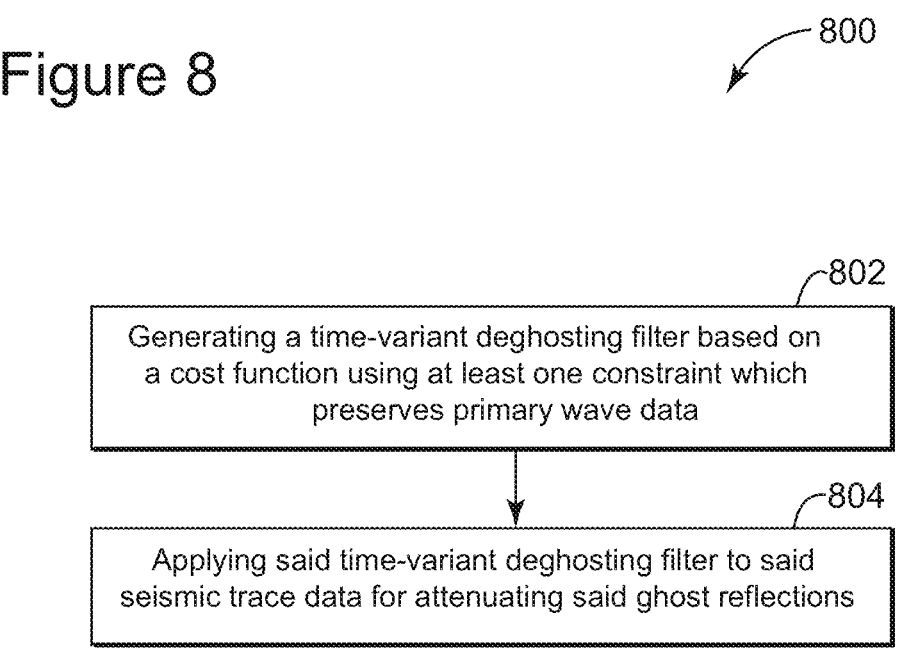
FIGS. 8-10 depict flowcharts of method embodiments.

Looking now to FIG. 8, a method embodiment 800 for attenuating ghost reflections in seismic trace data is depicted. It should be noted in the embodiment that the seismic data can be a single trace or a stack of traces. Starting at step 802, the method embodiment 800 selects a cost function and associated constraints for optimizing removal of the ghost reflections. Next at step 804, the method embodiment 800 generates a time-variant deghosting filter based on the previously selected cost function. It should be noted in the embodiment that the determination can be performed in a frequency domain or in a time domain. Next at step 806, the method embodiment 800 applies the time-variant deghosting filter to the seismic trace data to attenuate the ghost reflections.

Figure 9:
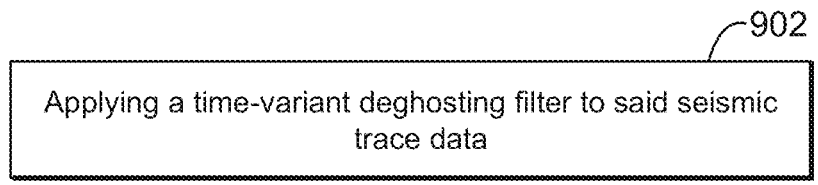

Looking now to FIG. 9, a method embodiment 900 for attenuating ghost reflections from seismic trace data is depicted. It should be noted in the embodiment that the seismic data can be a single trace or a stack of traces. Starting with step 902, the method embodiment 900 applies a time-variant deghosting filter designed with a noise minimization constraint to the seismic data.

Figure 10:
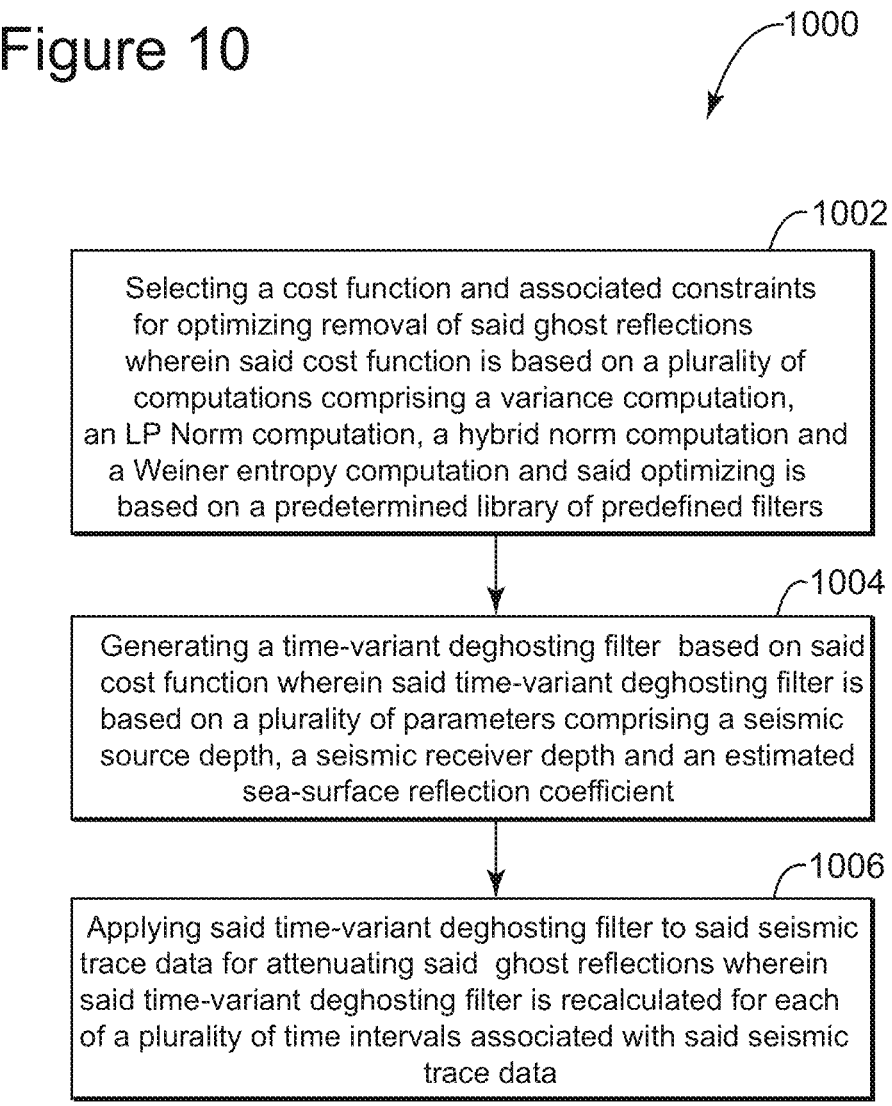

Looking now to FIG. 10, a method embodiment 1000 for attenuating ghost reflections in seismic trace data is depicted. It should be noted in the embodiment that the seismic data can be a single trace or a stack of traces. Starting at step 1002, the method embodiment 1000 selects a cost function and associated constraints for optimizing removal of the ghost reflections. It should be noted in the method embodiment 1000 that the cost function is based on a plurality of computations comprising a variance computation, an $L^P$ Norm computation, a Hybrid Norm computation and a Wiener entropy computation. It should further be noted in the method embodiment 1000 that the optimizing is based on a predetermined library of predefined filters.

Next at step 1004, the method embodiment 1000 generates a time-variant deghosting filter based on the previously selected cost function. It should be noted in the method embodiment that the time-variant deghosting filter is based on a plurality of parameters comprising a seismic source depth, a seismic receiver depth and an estimated sea-surface reflection coefficient. It should further be noted in the embodiment that the determination can be performed in a frequency domain or in a time domain.

Next at step 1006, the method embodiment 1000 applies the time-variant deghosting filter to the seismic trace data to attenuate the ghost reflections. It should be noted in the method embodiment 1000 that the time-variant deghosting filter is recalculated for each of a plurality of time intervals associated with the seismic trace data.

Figure 11:
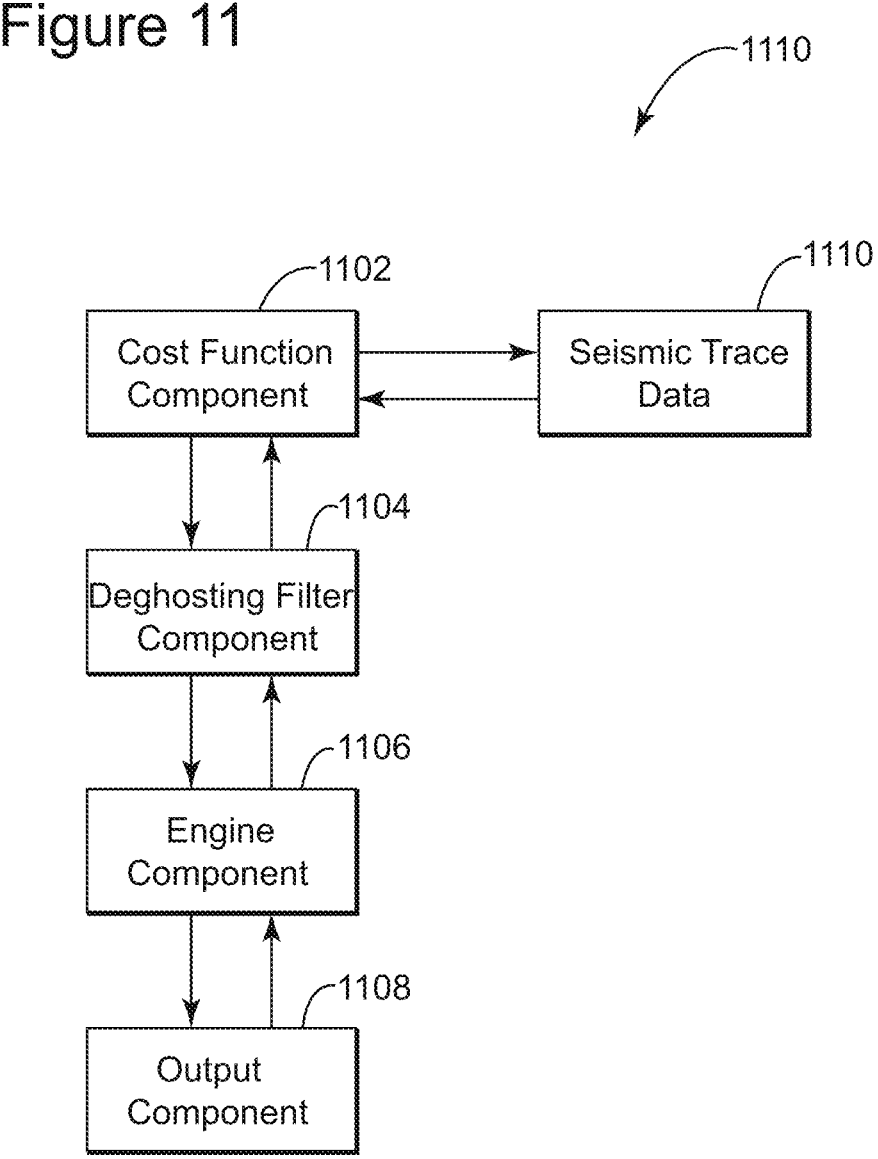
FIG. 11 depicts various aspects of software components or modules which can be used to implement the embodiments.

Looking now to FIG. 11, a schematic diagram of an embodiment node 1100 for attenuating ghost reflections in seismic trace data is depicted. It should be noted in the embodiment node 1100 that the seismic trace data 1110 can be a single seismic trace or a stack of seismic traces. The embodiment node 1100 comprises a cost function component 1102, a deghosting filter component 1104, an engine component 1106, an output component 1108 and a seismic trace dataset 1110. Continuing with the embodiment node 1100, the cost function component 1102 provides the capability to select one or more cost functions and their associated optimization constraints.

Next in the embodiment node 1100, the deghosting filter component 1104 provides the capability to compute a time-variant deghosting filter. Continuing with the embodiment node 1100, the engine component 1106 provides the capability for deghosting the seismic trace data 1110. It should be noted in the embodiment that the seismic trace data is deghosted by applying the time-variant deghosting filter to the seismic trace data 1110. Next in the embodiment node 1100, the output component provides the capability to output the deghosted seismic trace data for further processing.

Figure 12:
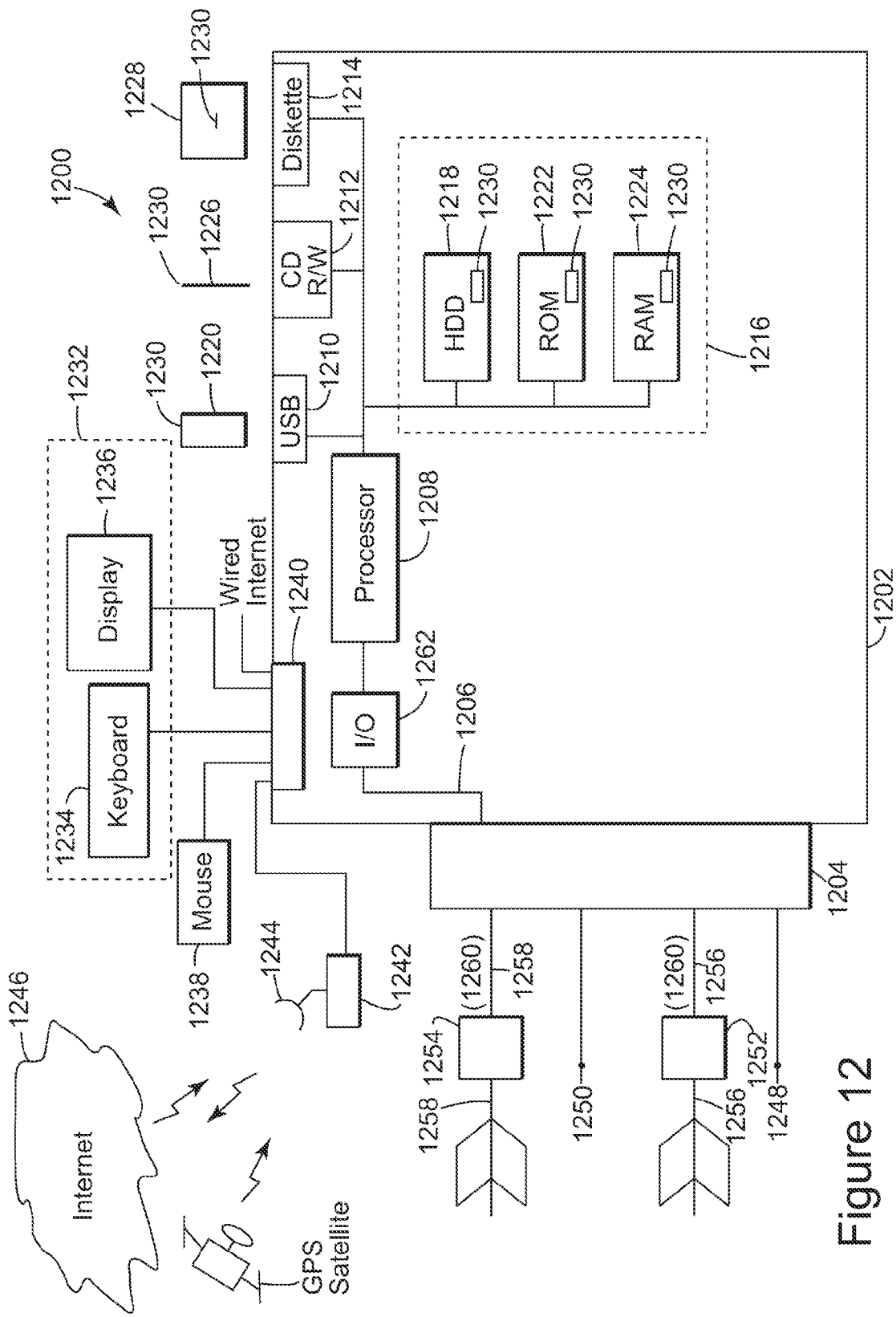
FIG. 12 depicts an exemplary data processing device or system which can be used to implement the embodiments.

The computing device(s) or other network nodes involved in attenuating ghost reflections in seismic trace data as set forth in the above described embodiments may be any type of computing device capable of processing and communicating seismic data associated with a seismic survey. An example of a representative computing system capable of carrying out operations in accordance with these embodiments is illustrated in FIG. 12. System 1200 includes, among other items, server 1202, source/receiver interface 1204, internal data/communications bus (bus) 1206, processor(s) 1208 (those of ordinary skill in the art can appreciate that in modern server systems, parallel processing is becoming increasingly prevalent, and whereas a single processor would have been used in the past to implement many or at least several functions, it is more common currently to have a single dedicated processor for certain functions (e.g., digital signal processors) and therefore could be several processors, acting in serial and/or parallel, as required by the specific application), universal serial bus (USB) port 1210, compact disk (CD)/digital video disk (DVD) read/write (R/W) drive 1212, floppy diskette drive 1214 (though less used currently, many servers still include this device), and data storage unit 1216.

Data storage unit 1216 itself can comprise hard disk drive (HDD) 1218 (these can include conventional magnetic storage media, but, as is becoming increasingly more prevalent, can include flash drive-type mass storage devices 1220, among other types), ROM device(s) 1222 (these can include electrically erasable (EE) programmable ROM (EEPROM) devices, ultra-violet erasable PROM devices (UVPROMs), among other types), and random access memory (RAM) devices 1224. Usable with USB port 1210 is flash drive device 1220, and usable with CD/DVD R/W device 1212 are CD/DVD disks 1226 (which can be both read and writeable). Usable with diskette drive device 1214 are floppy diskettes 1228. Each of the memory storage devices, or the memory storage media (1218, 1220, 1222, 1224, 1226, and 1228, among other types), can contain parts or components, or in its entirety, executable software programming code (software) 1230 that can implement part or all of the portions of the method described herein. Further, processor 1208 itself can contain one or different types of memory storage devices (most probably, but not in a limiting manner, RAM memory storage media 1224) that can store all or some of the components of software 1230.

In addition to the above described components, system 1200 also comprises user console 1232, which can include keyboard 1234, display 1236, and mouse 1238. All of these components are known to those of ordinary skill in the art, and this description includes all known and future variants of these types of devices. Display 1236 can be any type of known display or presentation screen, such as liquid crystal displays (LCDs), light emitting diode displays (LEDs), plasma displays, cathode ray tubes (CRTs), among others. User console 1232 can include one or more user interface mechanisms such as a mouse, keyboard, microphone, touch pad, touch screen, voice-recognition system, among other inter-active inter-communicative devices.

User console 1232, and its components if separately provided, interface with server 1202 via server input/output (I/O) interface 1240, which can be an RS232, Ethernet, USB or other type of communications port, or can include all or some of these, and further includes any other type of communications means, presently known or further developed. System 1200 can further include communications satellite/global positioning system (GPS) transceiver device 1242, to which is electrically connected at least one antenna 1244 (according to an embodiment, there would be at least one GPS receive-only antenna, and at least one separate satellite bi-directional communications antenna). System 1200 can access internet 1246, either through a hard wired connection, via I/O interface 1240 directly, or wirelessly via antenna 1244, and transceiver 1242.

Server 1202 can be coupled to other computing devices, such as those that operate or control the equipment of ship 102 of FIG. 1, via one or more networks. Server 1202 may be part of a larger network configuration as in a global area network (GAN) (e.g., internet 1246), which ultimately allows connection to various landlines.

According to a further embodiment, system 1200, being designed for use in seismic exploration, will interface with one or more sources 1248, 1250 and one or more receivers 1252, 1254. As further previously discussed, sources 1248, 1250 and receivers 1252, 1254 can communicate with server 1202 either through an electrical cable that is part of streamer 1256, 1258, or via a wireless system that can communicate via antenna 1244 and transceiver 1242 (collectively described as communications conduit 1260).

According to further exemplary embodiments, user console 1232 provides a means for personnel to enter commands and configuration into system 1200 (e.g., via a keyboard, buttons, switches, touch screen and/or joy stick). Display device 1236 can be used to show: source/receiver 1256, 1258 position; visual representations of acquired data; source 1248, 1250 and receiver 1252, 1254 status information; survey information; and other information important to the seismic data acquisition process. Source and receiver interface unit 1204 can receive the seismic data from receiver 1252, 1254 though communication conduit 1260 (discussed above). Source and receiver interface unit 1204 can also communicate bi-directionally with sources 1248, 1250 through the communication conduit 1260. Excitation signals, control signals, output signals and status information related to source 1248, 1250 can be exchanged by communication conduit 1260 between system 1200 and source 1248, 1250.

Bus 1206 allows a data pathway for items such as: the transfer and storage of data that originate from either the source sensors or receivers; for processor 1208 to access stored data contained in data storage unit memory 1216; for processor 1208 to send information for visual display to display 1236; or for the user to send commands to system operating programs/software 1230 that might reside in either the processor 1208 or the source and receiver interface unit 1204.

System 1200 can be used to implement the methods described above associated with attenuating ghost reflections in seismic trace data according to an exemplary embodiment. Hardware, firmware, software or a combination thereof may be used to perform the various steps and operations described herein. According to an exemplary embodiment, software 1230 for carrying out the above discussed steps can be stored and distributed on multi-media storage devices such as devices 1218, 1220, 1222, 1224, 1226, and/or 1228 (described above) or other form of media capable of portably storing information (e.g., universal serial bus (USB) flash drive 1220). These storage media may be inserted into, and read by, devices such as the CD-ROM drive 1212, the disk drive 1214, among other types of software storage devices.

Figure 13A:
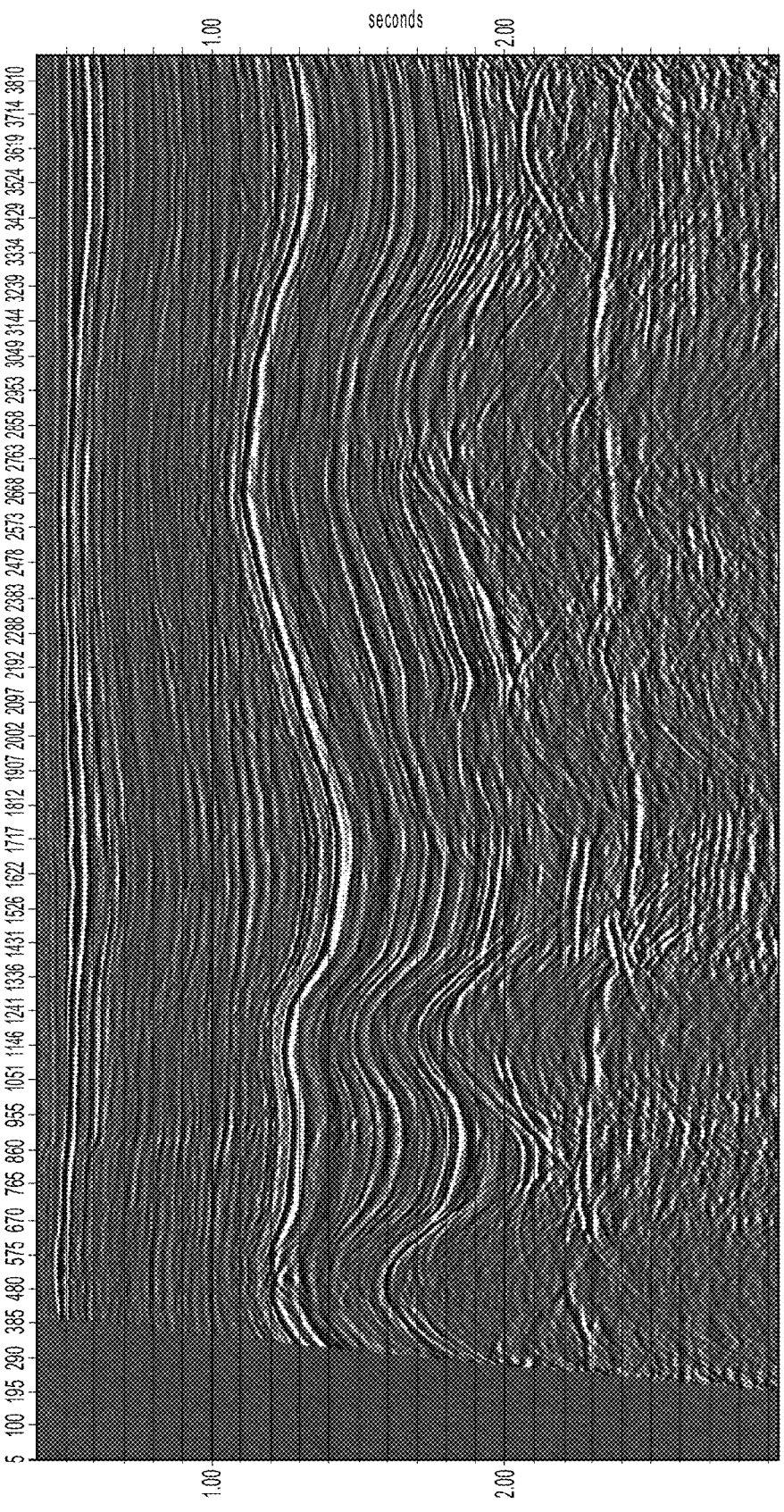
FIGS. 13A-13B depict before and after images associated with application of the embodiments described herein.
Figure 13B:
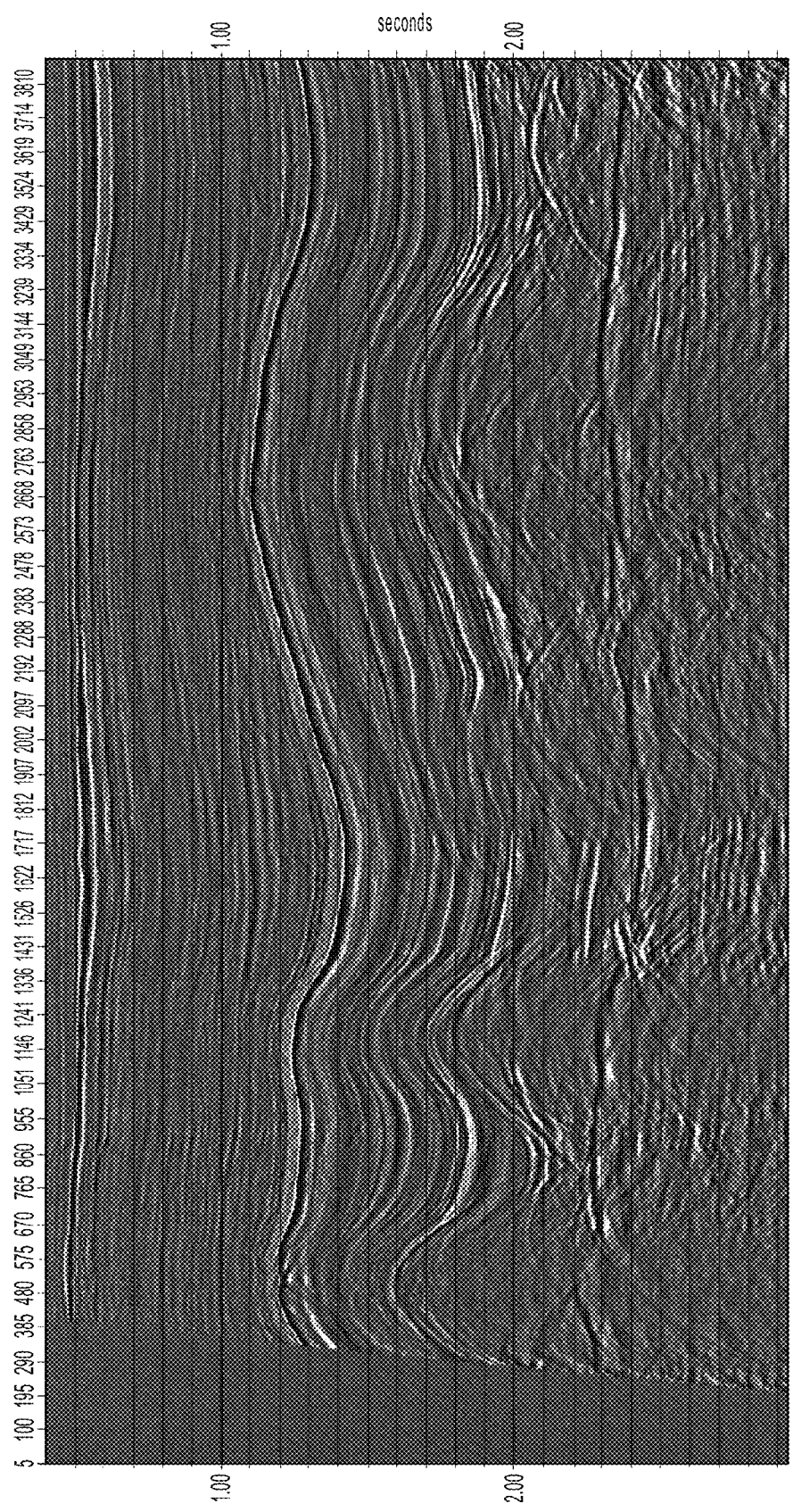

Looking now to FIG. 13A and FIG. 13B, FIG. 13A depicts a seismic trace image before deghosting (i.e., an image which still contains both source and receiver ghosts) and FIG. 13B depicts a seismic trace image of a deghosting based on the embodiments described herein. It is clear in a comparison of the images that a significantly greater number of ghosts have been removed by the application of the embodiments described herein. Further, looking to FIG. 14 of the amplitude spectra, it is clear that the dips associated with the ghosts in the seismic data are significantly reduced after applying the subject embodiments to the seismic trace data.

It should be noted in the embodiments described herein that these techniques can be applied in either an "offline", e.g., at a land-based data processing center or an "online" manner, i.e., in near real time while onboard the seismic vessel. For example, predicting a desired seismic quantity at a desired location of a desired depth can occur as the seismic data is recorded onboard the seismic vessel. In this case, it is possible for the prediction to be generated as a measure of the quality of the sampling run.

The disclosed exemplary embodiments provide a server node, and a method for predicting a desired seismic quantity at a desired location of a desired depth. It should be understood that this description is not intended to limit the invention. On the contrary, the exemplary embodiments are intended to cover alternatives, modifications and equivalents, which are included in the spirit and scope of the invention. Further, in the detailed description of the exemplary embodiments, numerous specific details are set forth in order to provide a comprehensive understanding of the invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a general purpose computer or a processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method, stored in a memory and executed by a processor, for attenuating ghost reflections in seismic trace data, said method comprising:
   acquiring said seismic trace data representative for seismic waves reflected by a formation under a water-bottom;
   generating a time-variant deghosting filter based on a cost function and using at least one constraint which preserves primary wave data in the seismic trace data, wherein the primary wave data is data other than data due to said ghost reflections from a water-air surface;
   applying said time-variant deghosting filter to said seismic trace data for attenuating said ghost reflections to obtain filtered seismic trace data; and
   generating an image of the formation using said filtered seismic trace data.

2. The method of claim 1, wherein said time-variant deghosting filter is based in part on a depth associated with a seismic source.

3. The method of claim 1, wherein said time-variant deghosting filter is based in part on a depth associated with a seismic receiver.

4. The method of claim 1, wherein said time-variant deghosting filter is based in part on an estimated sea-surface reflection coefficient.

5. The method of claim 1, wherein said cost function is based in part on a variance computation.

6. The method of claim 1, wherein said cost function is based in part on an $L^P$ Norm computation.

7. The method of claim 1, wherein said cost function is based in part on a Wiener entropy computation.

8. The method of claim 1, wherein said cost function is comprised of at least two cost functions selected from a variance cost function, an $L^P$ Norm cost function, a Hybrid Norm cost function and a Wiener entropy cost function.

9. The method of claim 1, wherein said at least one constraint prevents attenuation of primary wave data from said seismic trace data.

10. The method of claim 1, wherein said optimizing is based on a set of predefined filters.

11. The method of claim 1, wherein said seismic trace data comprises stacking a plurality of seismic traces before attenuating ghost reflections.

12. A method, stored in a memory and executed by a processor, for attenuating ghost reflections from seismic trace data, said method comprising:
    acquiring said seismic trace data representative for seismic waves reflected by a formation under a water-bottom;
    applying a time-variant deghosting filter to said seismic trace data to obtain filtered seismic trace data; and
    generating an image of the formation using said filtered seismic trace data.

13. The method of claim 12, wherein time-variant deghosting filter is based on a cost function and at least one constraint for preserving primary wave data.

14. The method of claim 13, wherein said at least one constraint prevents amplification of signal noise associated with said seismic trace data.

15. The method of claim 13, wherein said cost function is based in part on a variance computation.

16. The method of claim 13, wherein said cost function is based in part on an $L^P$ Norm computation.

17. The method of claim 13, wherein said cost function is based in part on a Wiener entropy computation.

18. A method, stored in a memory and executed by a processor, for attenuating ghost reflections in seismic trace data, said method comprising:
    acquiring said seismic trace data representative for seismic waves reflected by a formation under a water-bottom;
    selecting a cost function and at least one associated constraint for optimizing removal of said ghost reflections wherein said cost function is based on one or more of a plurality of computations comprising a variance computation, an $L^P$ Norm computation, a hybrid norm computation and a Wiener entropy computation and said optimizing is based on a predetermined library of predefined filters;
    generating a time-variant deghosting filter based on said cost function wherein said time-variant deghosting filter is based on a plurality of parameters comprising a seismic source depth, a seismic receiver depth and an estimated sea-surface reflection coefficient;
    applying said time-variant deghosting filter to said seismic trace data for attenuating said ghost reflections to obtain filtered seismic trace data, wherein said time-variant deghosting filter is recalculated for each of a plurality of time intervals associated with said seismic trace data; and
    generating an image of the formation using said filtered seismic trace data.

* * * * *